(12) United States Patent
Erickson et al.

(10) Patent No.: US 9,145,178 B2
(45) Date of Patent: Sep. 29, 2015

(54) FIFTH-WHEEL TRAILER HITCH

(75) Inventors: Nick Erickson, Boone, IA (US); Steven Houge, Polk City, IA (US)

(73) Assignee: NSD Innovations, LLC, Ames, IA (US)

( * ) Notice: Subject to any disclaimer, the term of this patent is extended or adjusted under 35 U.S.C. 154(b) by 742 days.

(21) Appl. No.: 12/618,056

(22) Filed: Nov. 13, 2009

(65) Prior Publication Data

US 2011/0115195 A1    May 19, 2011

(51) Int. Cl.
| | |
|---|---|
| *B62D 53/08* | (2006.01) |
| *B62D 53/06* | (2006.01) |
| *B60D 1/01* | (2006.01) |
| *B60D 1/07* | (2006.01) |

(52) U.S. Cl.
CPC .............. *B62D 53/061* (2013.01); *B60D 1/015* (2013.01); *B60D 1/07* (2013.01); *B62D 53/08* (2013.01); *Y10T 29/49716* (2015.01)

(58) Field of Classification Search
CPC ............... B62D 53/08; B62D 53/0828; B62D 53/0835; B62D 53/0807; B62D 53/061; D06D 1/50; D06D 1/52
USPC ............. 280/901, 415.1, 416.1, 417.1, 418.1, 280/433, 434, 441, 441.2, 423.1, 439
See application file for complete search history.

(56) References Cited

U.S. PATENT DOCUMENTS

| | | | |
|---|---|---|---|
| 2,676,033 A * | 4/1954 | Housh et al. ................ | 280/438.1 |
| 3,073,624 A * | 1/1963 | Thomas ...................... | 280/438.1 |
| 3,826,516 A * | 7/1974 | Weber ........................... | 280/407 |
| 5,344,172 A * | 9/1994 | Jaun ............................. | 280/415.1 |
| 5,356,167 A * | 10/1994 | Hall et al. ..................... | 280/492 |
| 5,513,869 A * | 5/1996 | Putnam ........................ | 280/415.1 |
| 5,516,137 A | 5/1996 | Kass et al. | |
| 5,529,329 A | 6/1996 | McCoy | |
| 5,639,106 A * | 6/1997 | Vitale et al. ................... | 280/407 |
| 5,772,229 A * | 6/1998 | Cattau ........................... | 280/438.1 |
| 5,988,665 A * | 11/1999 | Terry et al. .................... | 280/434 |
| 6,170,850 B1 | 1/2001 | Works | |
| 6,247,720 B1 | 6/2001 | Linger et al. | |
| 6,485,045 B1 * | 11/2002 | King ............................ | 280/417.1 |
| 7,264,259 B2 | 9/2007 | Lindenman et al. | |
| 7,673,895 B1 * | 3/2010 | Hesse et al. .................. | 280/417.1 |
| 7,753,391 B1 * | 7/2010 | Hesse et al. ................... | 280/439 |
| 2010/0237587 A1 * | 9/2010 | McCoy et al. ................ | 280/433 |

OTHER PUBLICATIONS

B&W, Companion—5th Wheel Hitch product advertisement documentation.

* cited by examiner

*Primary Examiner* — Anne Marie Boehler
(74) *Attorney, Agent, or Firm* — Davis, Brown, Koehn, Shors & Roberts, P.C.; Sean D. Solberg

(57) ABSTRACT

A fifth-wheel hitch assembly is provided that converts a gooseneck hitch installed on a vehicle into a fifth-wheel hitch for receiving a kingpin. The hitch assembly generally includes a base assembly, a T-arm assembly for securing the gooseneck ball or gooseneck post of the installed gooseneck hitch, and a hitch head. The T-arm assembly includes a mechanism for pulling up on the gooseneck hitch, thus securing the base assembly against the vehicle bed.

8 Claims, 18 Drawing Sheets

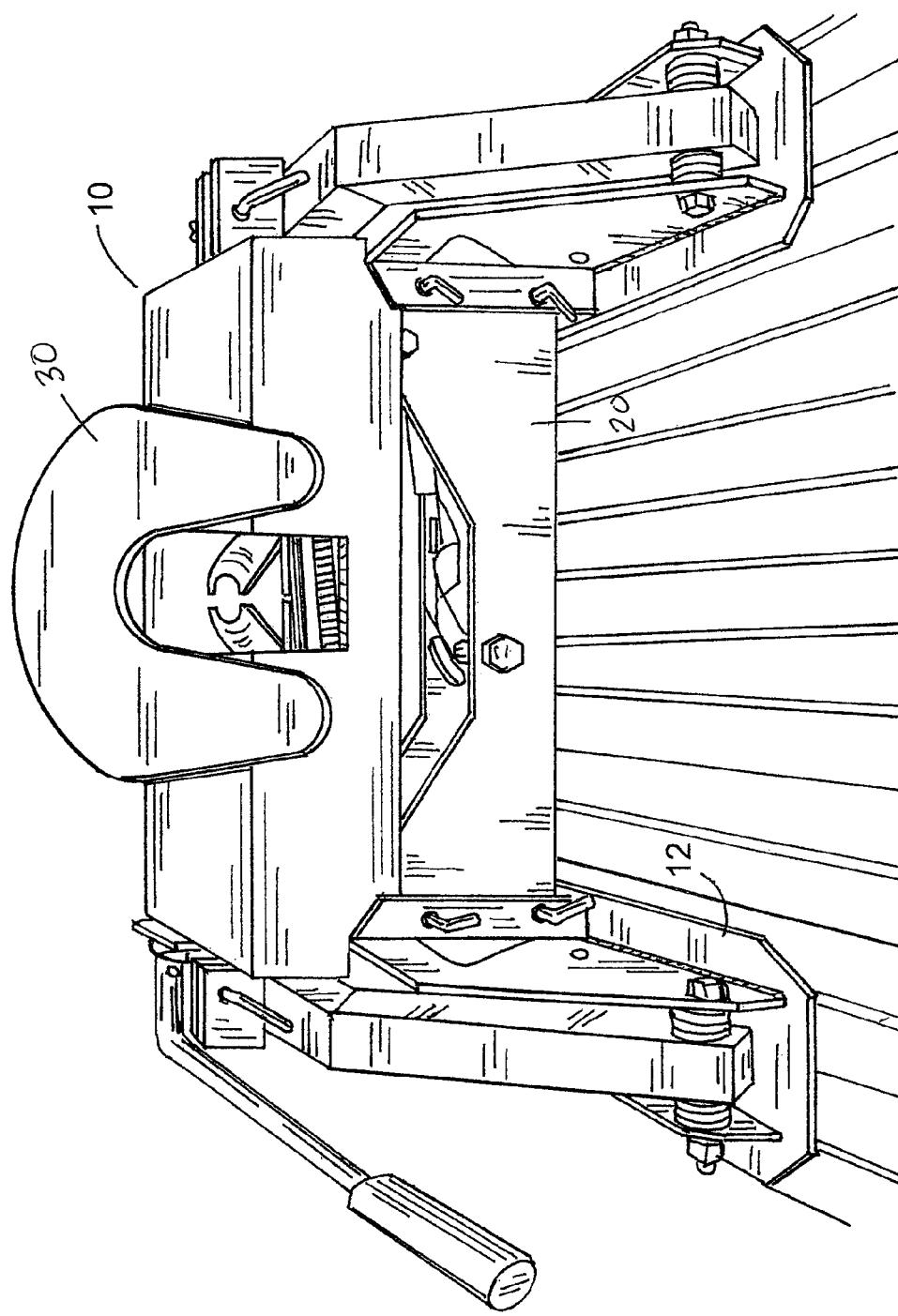

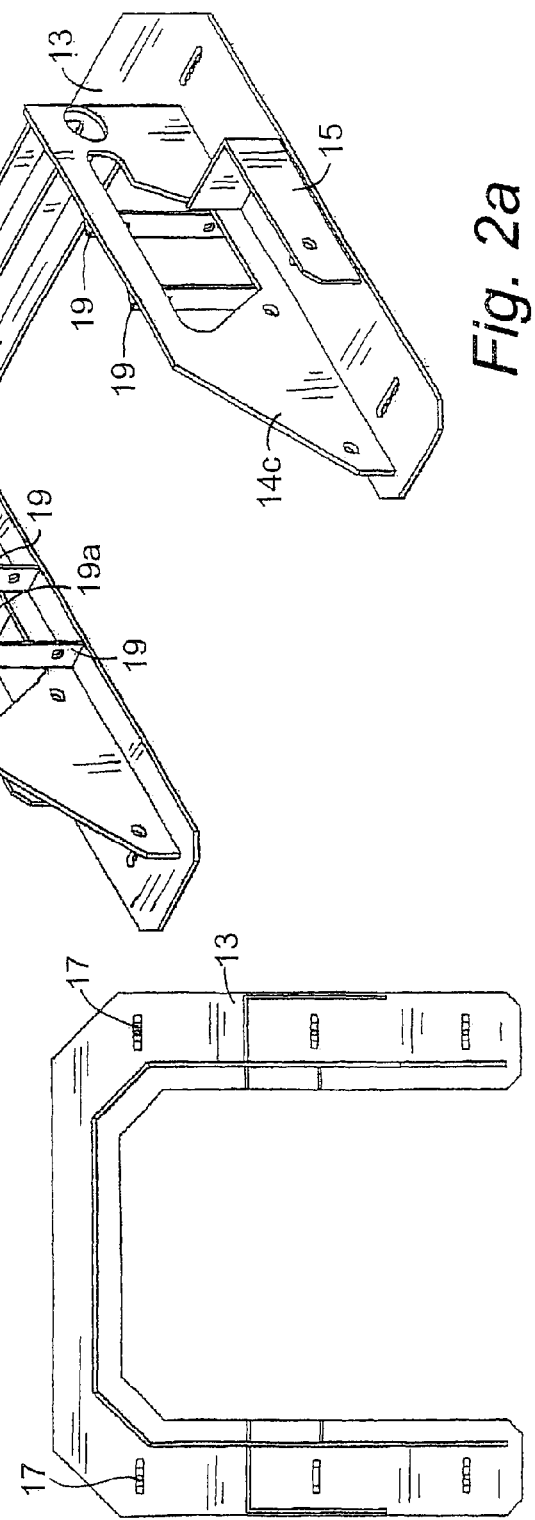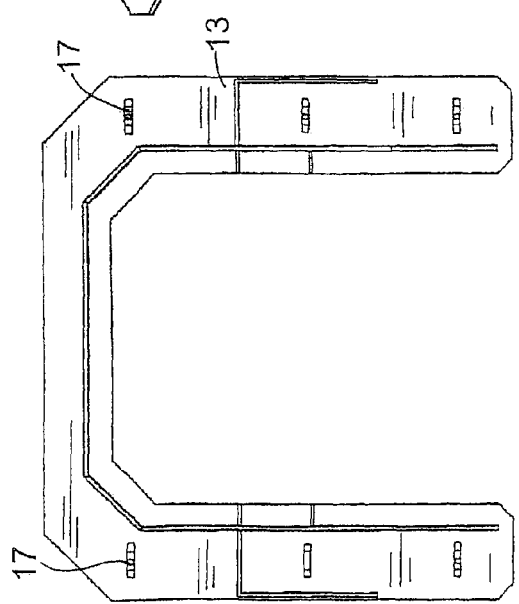

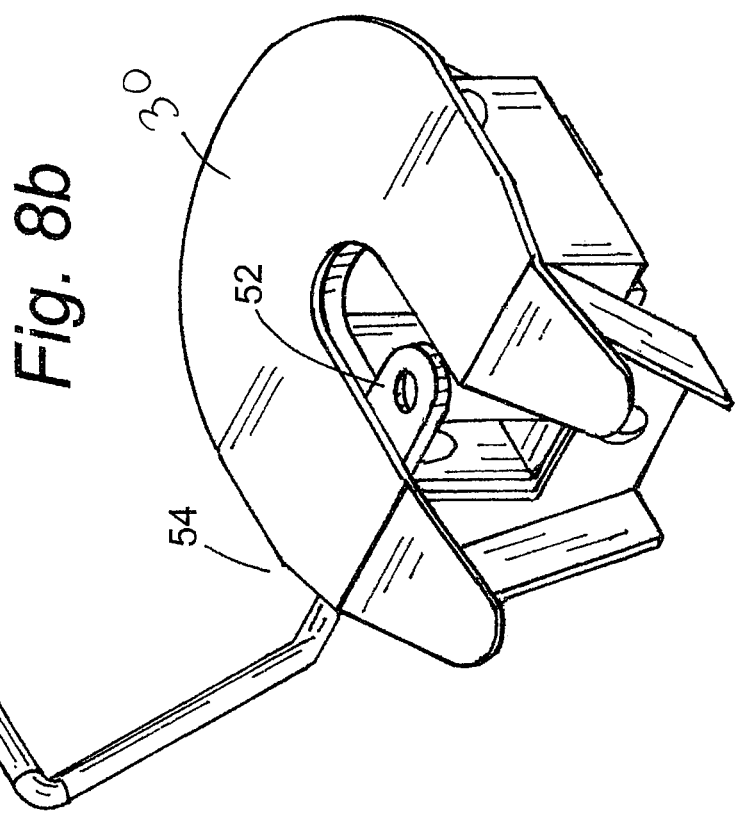
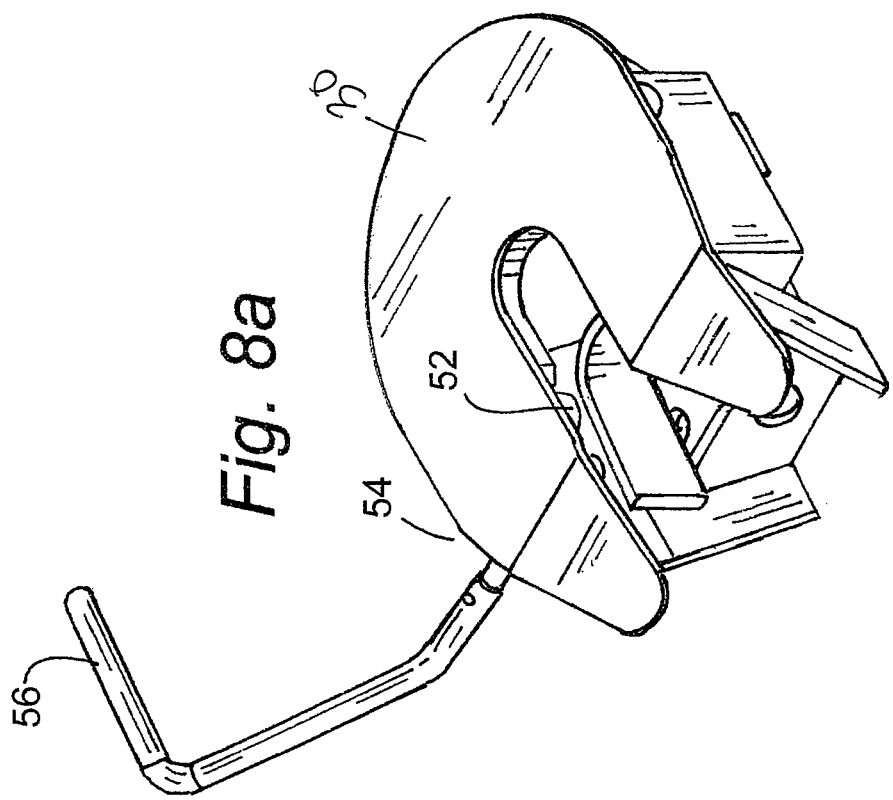

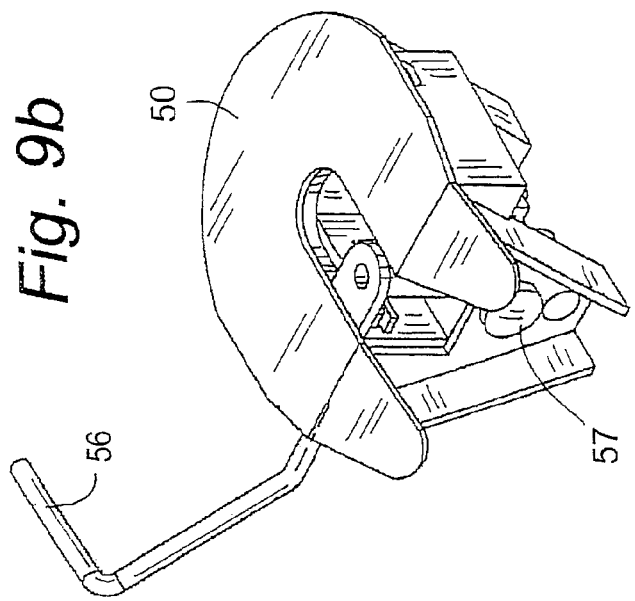
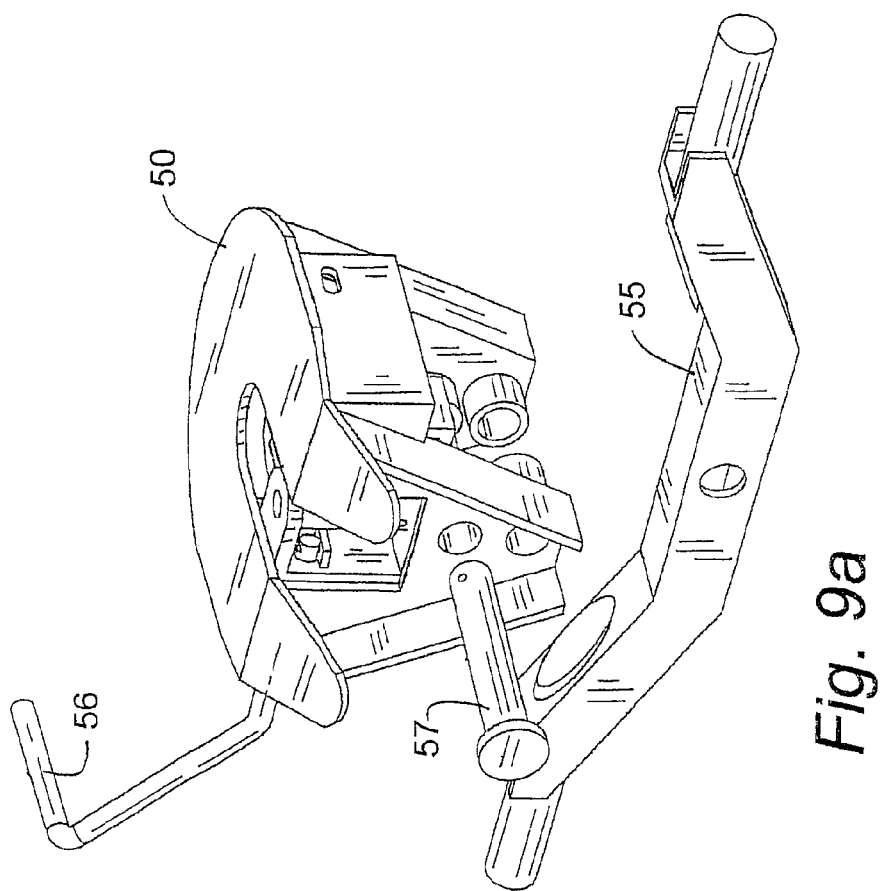

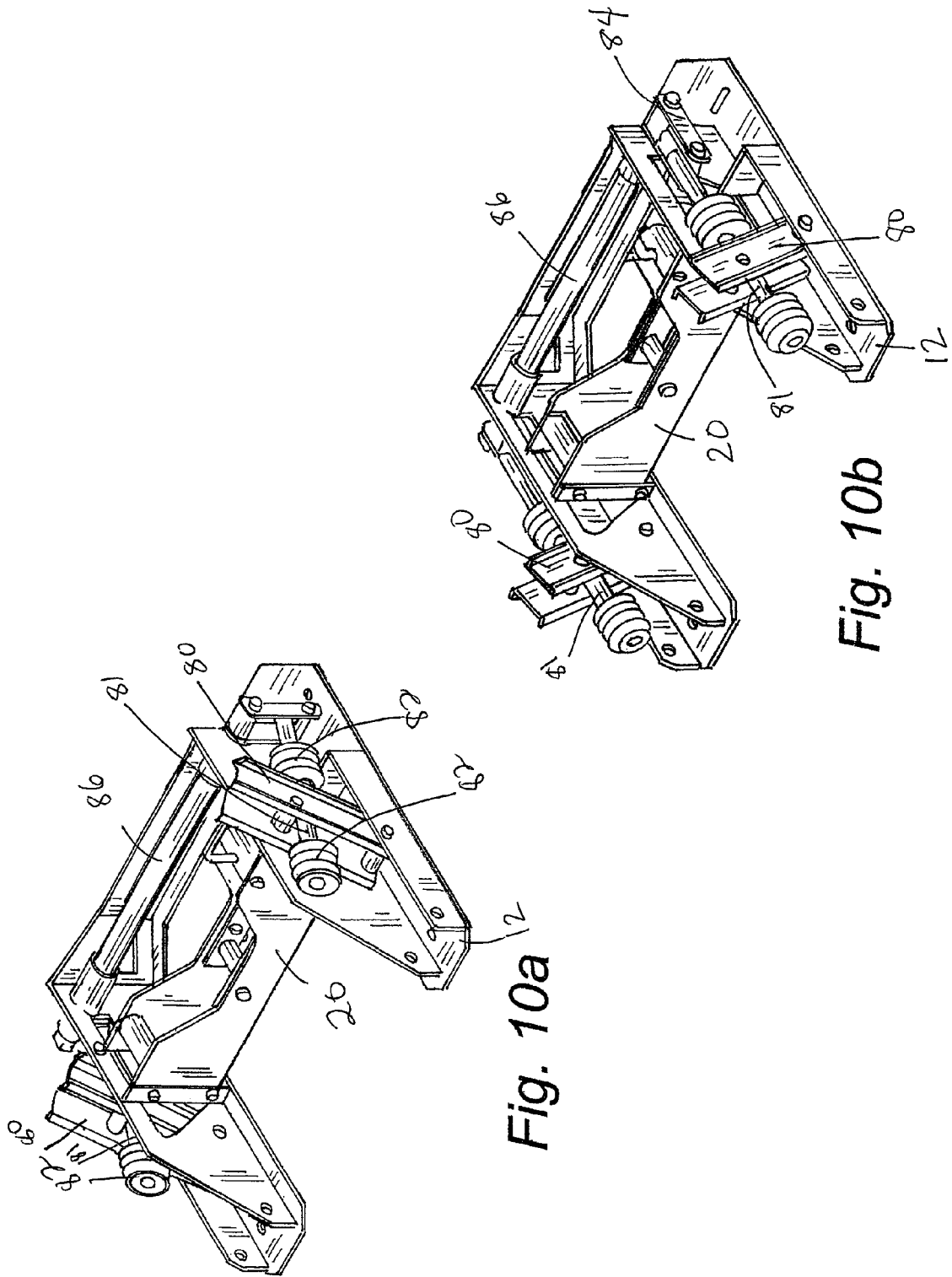

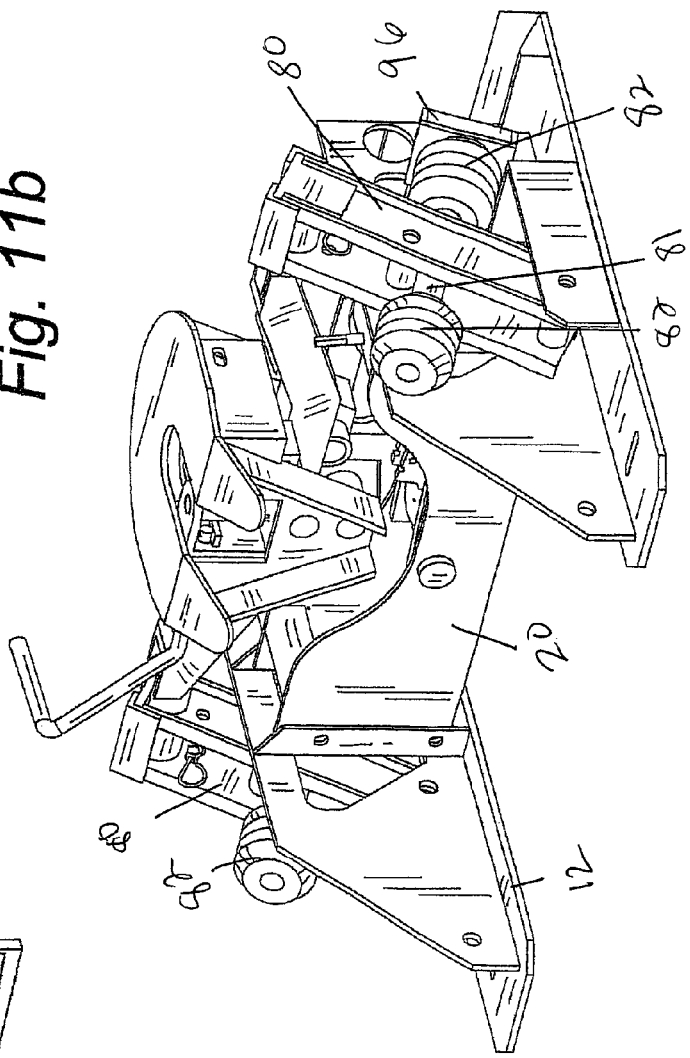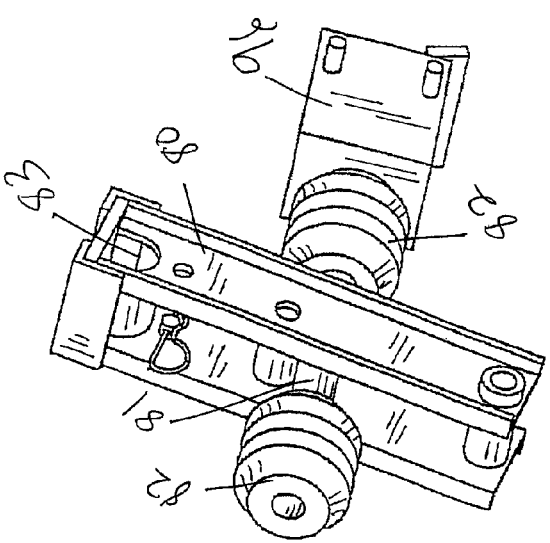

FIFTH-WHEEL TRAILER HITCH

BACKGROUND OF THE INVENTION

The invention relates generally to a fifth wheel hitch, and more particularly to a fifth-wheel hitch assembly device for converting a gooseneck towing system to a fifth wheel hitch towing system.

The popularity of gooseneck towing has increased dramatically. Fifth wheel towing has also increased in popularity. Fifth wheel travel trailers have steadily become more common due to the size and weight of many new campers. Consumers frequently need to use both a gooseneck hitch and a fifth wheel hitch.

Gooseneck hitches have the advantage of providing a hitch when towing is required, but when a level truck bed is desired, the gooseneck ball can be removed to provide such a level surface as the frame of the gooseneck hitch resides underneath the truck bed. Typical fifth wheel hitches do not offer this capability; standard fifth wheel hitches are not easily removable to provide a level truck bed.

There are many different types of gooseneck hitches available, but few products are available that convert a gooseneck hitch to a fifth-wheel hitch. One product with this capability is the Companion hitch created by B & W Custom Truck Beds, Inc. The Companion hitch works exclusively with the B & W gooseneck trailer to convert the B & W gooseneck hitch to a fifth-wheel hitch.

A need exists for a device that has the capability to convert any gooseneck hitch to a fifth-wheel hitch.

SUMMARY OF THE INVENTION

One object of the present invention is to provide a fifth-wheel hitch.

A further object of the present invention is to provide a fifth-wheel hitch that converts a gooseneck hitch to a fifth-wheel hitch.

Another object of the present invention is to provide a fifth wheel hitch that universally connects to any gooseneck hitch.

An additional object of the present invention is to provide a device that allows users to use either a gooseneck hitch or a fifth-wheel hitch.

These and other objects of the present invention will become apparent to those skilled in the art upon reference to the following specification, drawings, and claims.

The present invention intends to overcome the difficulties encountered heretofore. To that end, a fifth-wheel hitch is provided. The hitch comprises a base unit coupled to a T-arm assembly that locks with a gooseneck hitch assembly installed on a vehicle. A hitch head that receives a kingpin is connected to the base assembly, either directly or through a cushioned arm system.

BRIEF DESCRIPTION OF THE DRAWINGS

FIG. 1 is a perspective view of the fifth-wheel hitch of the present invention.

FIGS. 2a-2d are views of the base assembly of the fifth-wheel hitch of the present invention.

FIG. 8a is a perspective view of one hitch head embodiment of the present invention, wherein the hitch head is open.

FIG. 8b is a perspective view of one hitch head embodiment of the present invention, wherein the hitch head is closed.

FIGS. 9a-9b show the hitch head and cross bar assembly of the present invention.

FIGS. 10a-c are views of a sliding assembly of the fifth-wheel hitch of the present invention.

FIGS. 11a-b are views of a stationary embodiment of the fifth-wheel hitch of the present invention.

DETAILED DESCRIPTION OF THE INVENTION

Figure 3A:
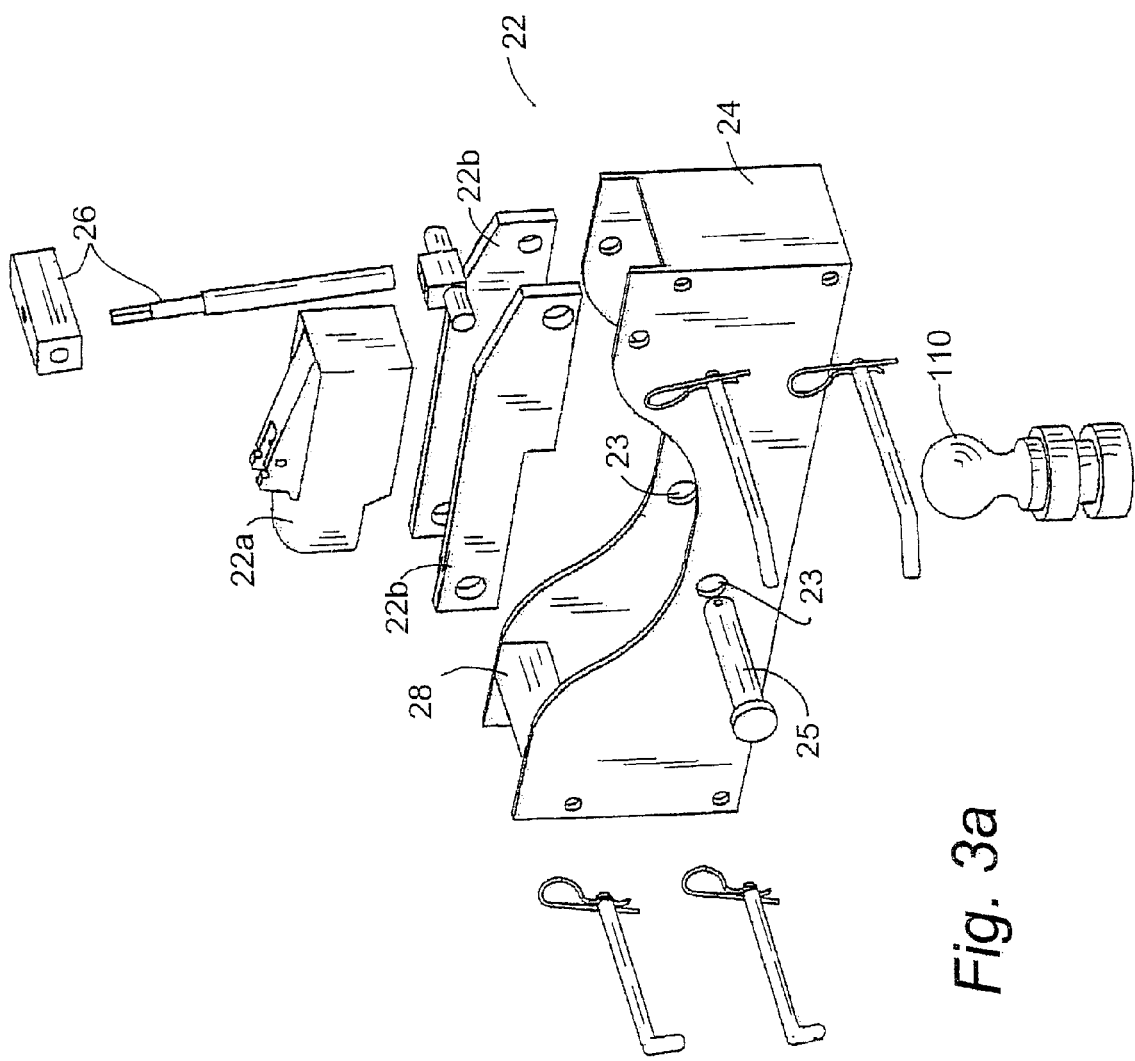
FIGS. 3a-3d are views of the T-arm assembly of the fifth-wheel hitch of the present invention.

In FIGS. 1-12, a fifth-wheel hitch 10 is provided. As seen generally in FIG. 1, the fifth-wheel hitch 10 includes three general components: a base assembly 12, a T-arm assembly 20, and a fifth-wheel head 30. The fifth wheel hitch 10 is mounted to the bed of a truck and is adapted to attach to both the ball of a gooseneck hitch and the king-pin of a trailer. This dual attachment allows for the conversion of a gooseneck hitch to a fifth-wheel hitch.

In FIGS. 2a-2d, the base assembly 12 has a generally U-shaped design. The base assembly 12 includes a flat base 13 and three sidewall three sections, a rear sidewall section 14a, a left sidewall section 14b, and a right sidewall section 14c. Outer support gussets 15 are provided adjacent to the left and right sidewall sections 14b, 14c.

In FIG. 2c, the base assembly 12 includes adjustable bed rib spacers 16 on the underside of the assembly 12. The bed rib spacers 16 fit within the down-ribs of the truck's box. Only the thickness of the box itself is sandwiched between the base assembly 12 and the gooseneck undercarriage below the bed of the truck because of the rib spacers 16. The flat base 13 includes slots 17 for adjustably connecting the base assembly 12 to the rib spacers 16 and for connecting the base assembly 12 to a standard rail kit 60.

The base assembly 12 includes alignment plates 19 attached to the interior of left sidewall 14b and right sidewall 14c. The alignment plates 19 create channels 19a to receive the T-arm assembly 20.

Figure 3B:
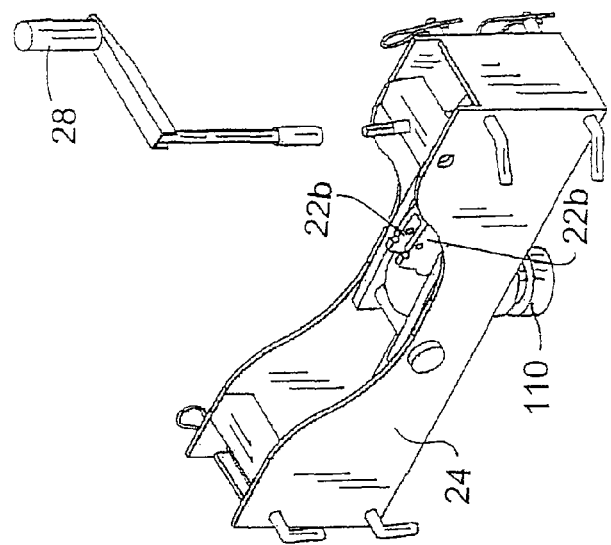
Figure 3D:
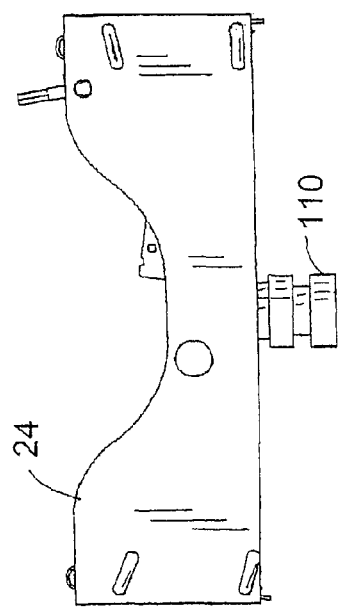
Figure 3C:
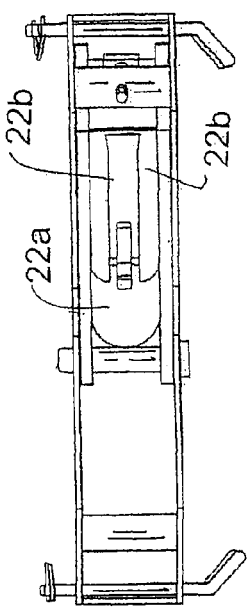
Figure 4:
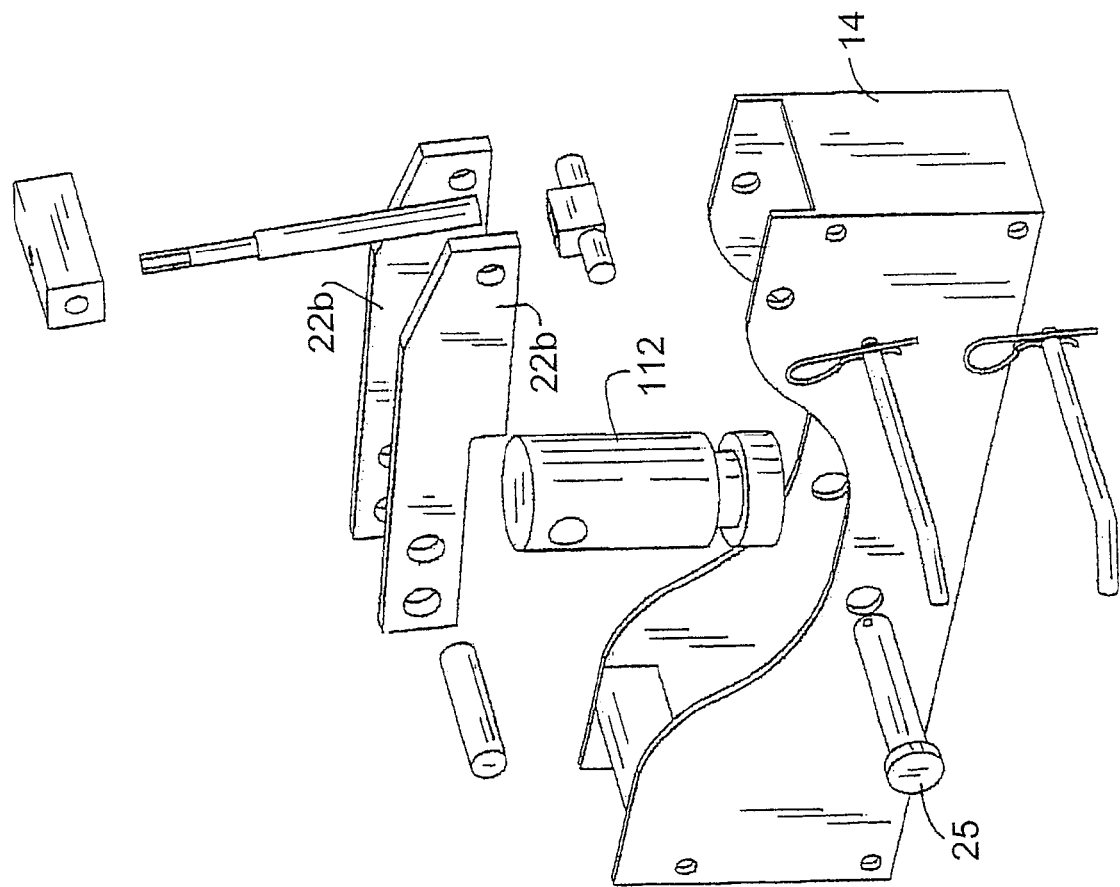
FIG. 4 is an exploded view of the T-arm assembly of the fifth-wheel hitch of the present invention.

As shown in FIGS. 3a-3c, the fifth-wheel hitch includes a T-arm assembly 20. The T-arm assembly 20 couples the gooseneck undercarriage installed on a truck to the base assembly 12 of the present invention. The T-arm assembly 20 slides in the 19a of the base assembly 12 and is attached by attachment means, most typically pins. There is a coupler leverage system 22 within the T-arm assembly. The coupler leverage system 22 engages the gooseneck ball 110 of the gooseneck hitch assembly installed on the vehicle. The leverage system 22 comprises a coupler 22a with two leverage arms 22b attached on each side. The leverage arms 22b and the T-arm assembly shell 24 include holes 23 that allow for the leverage system 22 to pivot. A pivot pin 25 extends through the holes 23. The coupler 22a and the leverage arms 22b lock the ball 110 and secure the fifth-wheel hitch assembly to the base of the vehicle.

On the opposing end of the leverage arms 22b, a screw assembly 26 is attached through a common hole 27. A user operates the handle 28 of the screw assembly to pull up on the leverages arms 22b and coupler 22a. Operation of the handle 28 will also pull up on the gooseneck ball. As the gooseneck ball 110 is rigid, this action forces the shell of the T-arm 24 down, in turn, forcing the base assembly 12 down against the bed of the truck and also the gooseneck carriage below it.

There are additional ways to connect the fifth-wheel hitch 10 to the gooseneck assembly installed on the vehicle. In one embodiment, the coupler 22a is not used. Instead, a pin or series of pins are installed around the lower profile of the gooseneck ball to lock the leverage arms 22b to the ball. In another embodiment, the gooseneck ball is removed, the coupler 22a is not used, and the coupler is substituted with a socket post 112 that has the same lower profile of the ball, shown in FIG. 4. The socket post 112 is locked into the gooseneck hitch, and the T-arm assembly is engaged to draw the fifth-wheel base 12 down to the bed of the truck.

A fifth-wheel head assembly 30 is attached to the base assembly 12. The head assembly 30 can be attached in a wide variety of ways. In one embodiment, the head 30 is attached through direct coupling on the sidewalls of the base assembly 12. A bracket is bolted to the sidewalls allowing the head 30 to be pinned.

The hitch head 50 itself accepts the kingpin of the trailer and locks it securely to the hitch 10. Any type of hitch head 50 works with the present invention. Typical hitch heads 50 have a four way pivot: for and aft, and side to side. They include a locking mechanism which consists of jaws wrapped around the king pin to secure the trailer to the hitch.

Figure 5:
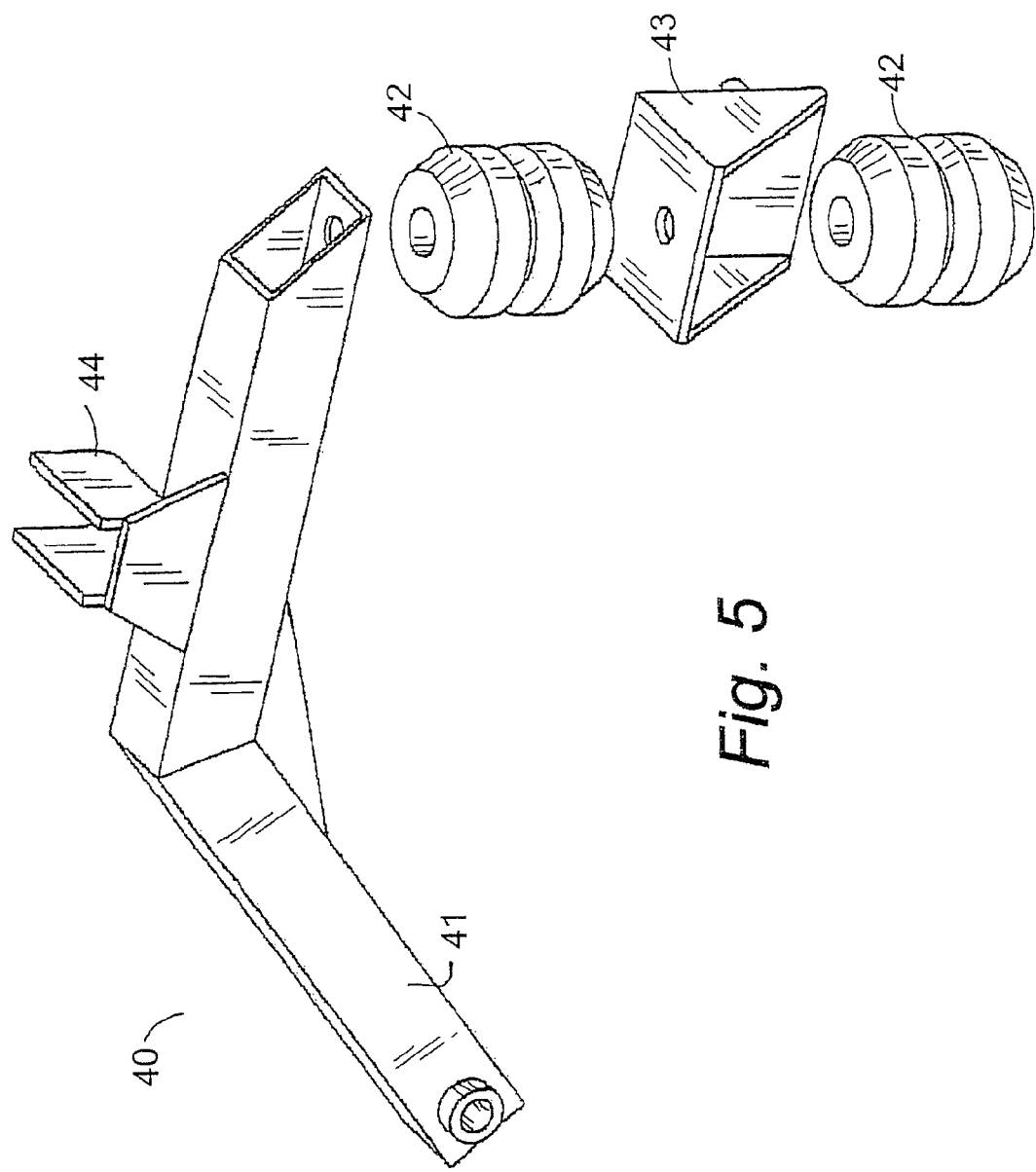
FIG. 5 is a view of the cushioned arm assembly of the present invention.
Figure 6A:
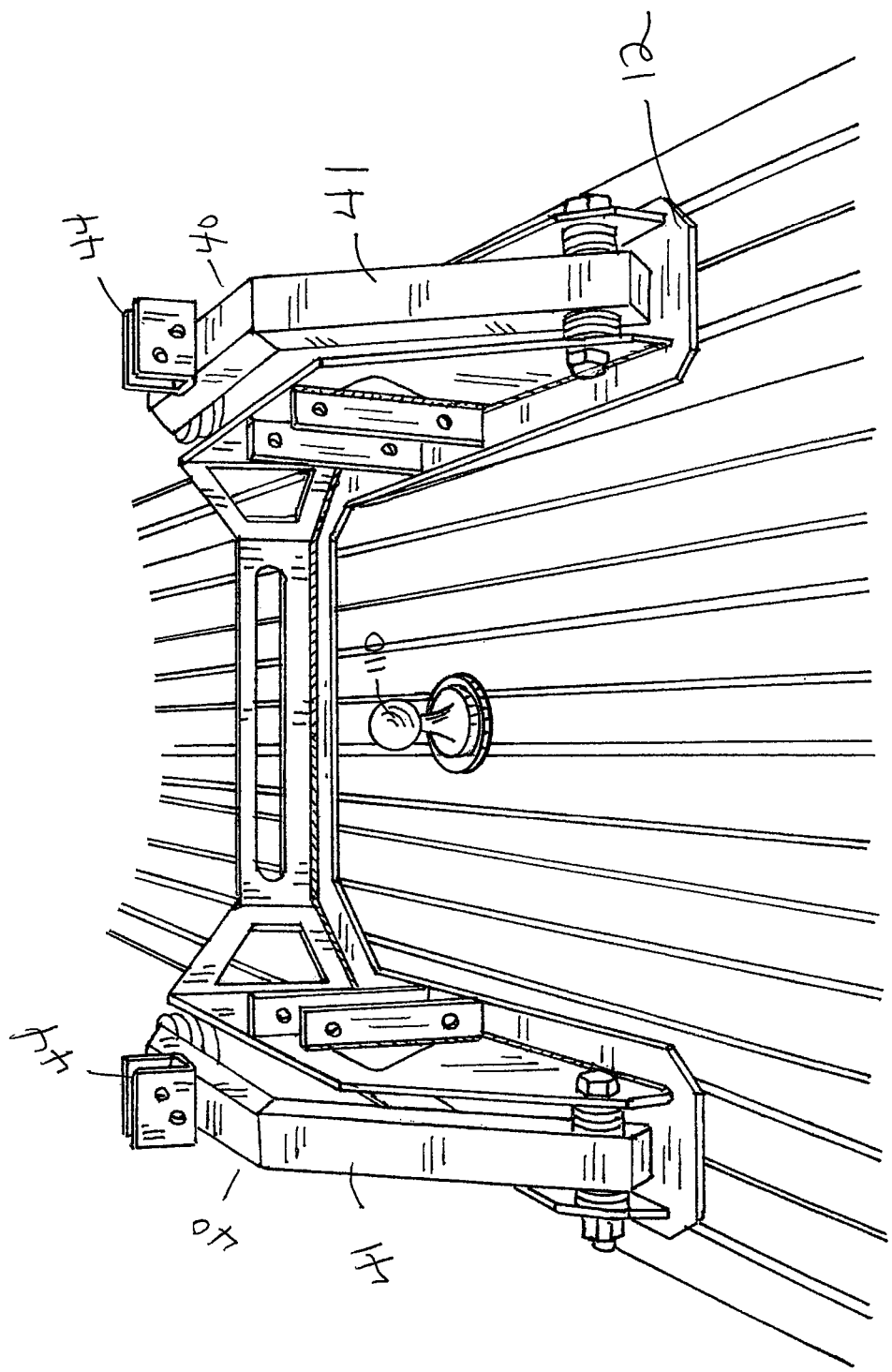
FIG. 6a is a view of the base assembly and cushioned arm assembly of the present invention.
Figure 6B:
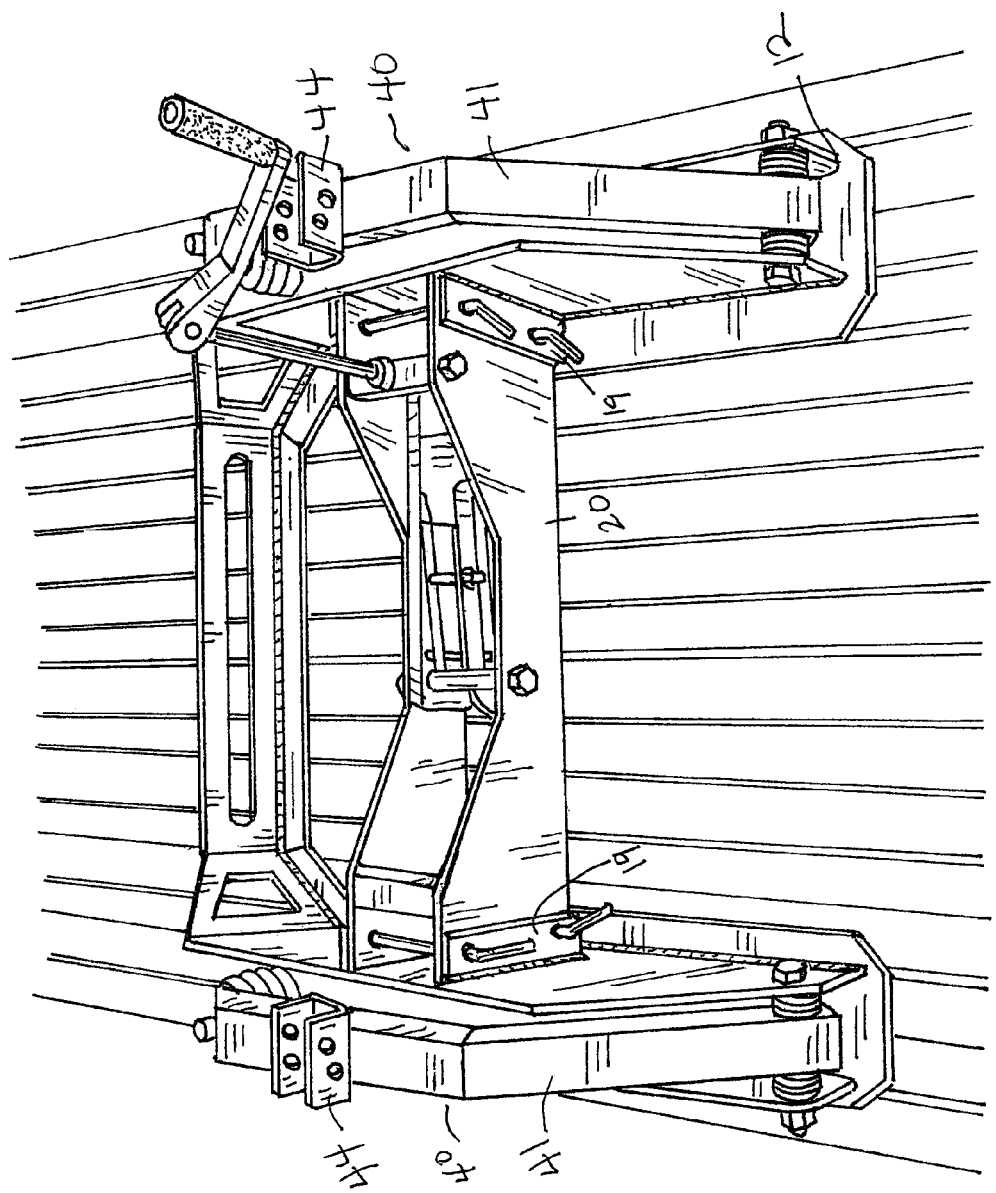
FIG. 6b is a view of the base assembly, cushioned arm assembly, and T-arm assembly of the present invention.
Figure 7B:
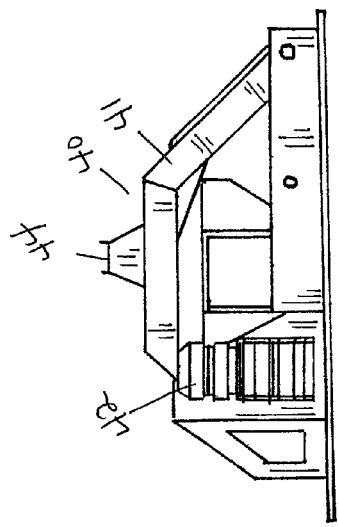
FIGS. 7a-7d are views of the base assembly, cushioned arm assembly, and T-arm assembly of the present invention.
Figure 7A:
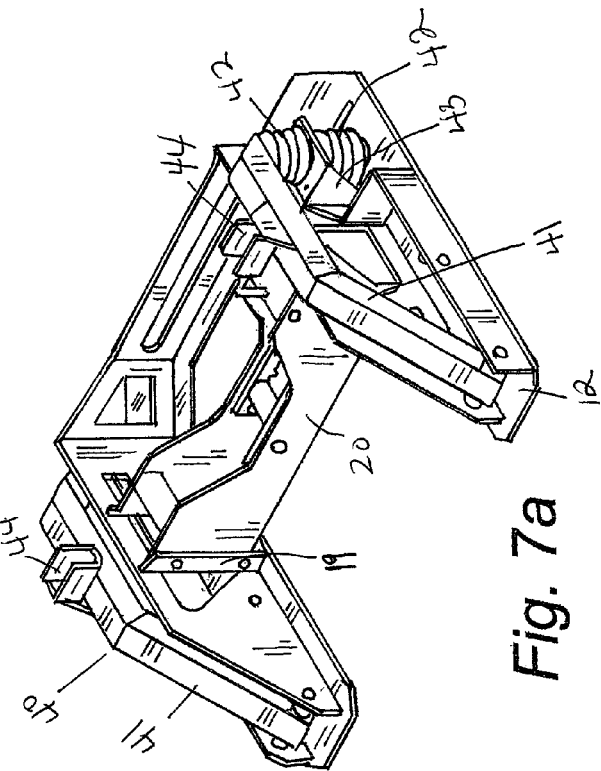
Figure 7C:
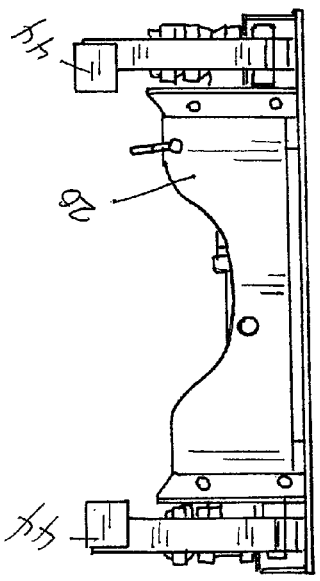
Figure 7D:
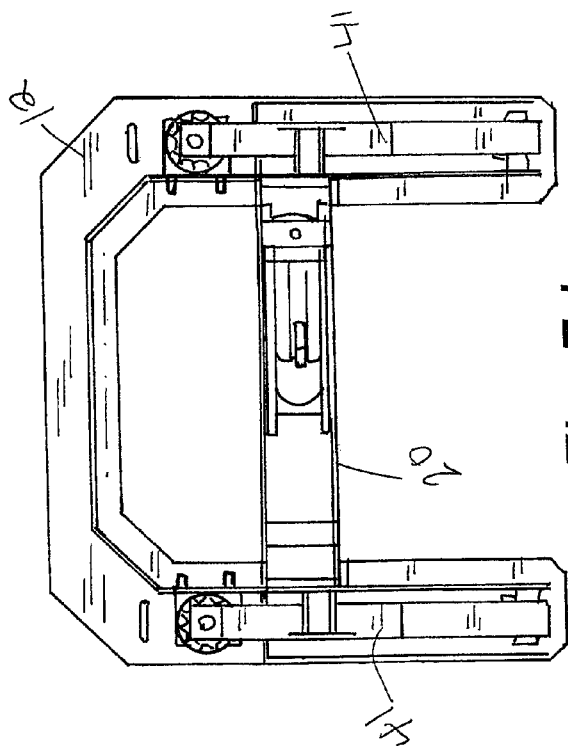

In another embodiment in FIGS. 5-7, a cushioned support arm assembly 40 is used to attach the head 30 to the base 12. Two cushioned assemblies 40 are connected to the sides of the base assembly 12. The assembly 40 includes an arm 41. One end of the arm 41 is connected to the base assembly 12. The cushioned arms sit at their rest position at an approximate 45 degree angle with respect to the base assembly 12. The opposite end of the arm 41 is bolted through two load boosters 42 and a support bracket 43. The load boosters 42 provide limited movement up and down under a load. The support bracket 43 bolts to the side wall of the base assembly 12. The arm 41 includes a cradle 44 to attach the head 30 to the arm. This design allows the head to move and thus absorb most of the impulse forces imposed on it and allows for less extreme forces to be imposed directly onto the base assembly 12 and consequently the truck itself, generating a better ride. The pivot point at the front of the support arm and the cushioned portion at the back lie along an inclined plane, so the cushioned support arms are able to absorb shock from both vertical forces, such as the tongue weight, as well as horizontal forces from pulling and breaking.

In FIG. 8, one specific hitch head embodiment of the present invention includes a sliding jaw assembly 51. The jaw features a sliding assembly consisting of a 90 degree elbow jaw 52 that rotates on a pivot point 53. The pivot point 53 is connected to a sliding jaw housing 54, thereby moving the elbow jaw 52 from side to side within the head assembly.

Prior to hookup, the elbow jaw is in the open position, ready to receive the kingpin of the camper and the sliding jaw housing is in the pulled-out position. As the king pin slides into the fifth wheel head, it rotates the elbow jaw forward with it. At the same time, it pushes the slider assembly out slightly, which releases the handle 56. When the king pin is fully slid into position, the sliding jaw housing moves back across the mouth of the fifth wheel head, most typically via a return spring, securing the hitch. To unhook, a user simply pulls a handle connected to the sliding jaw housing. This allows the king pin to move out of the mouth of the hitch and rotate the elbow jaw back to the open position at the same time. The entire head itself pivots side to side.

Figure 10C:
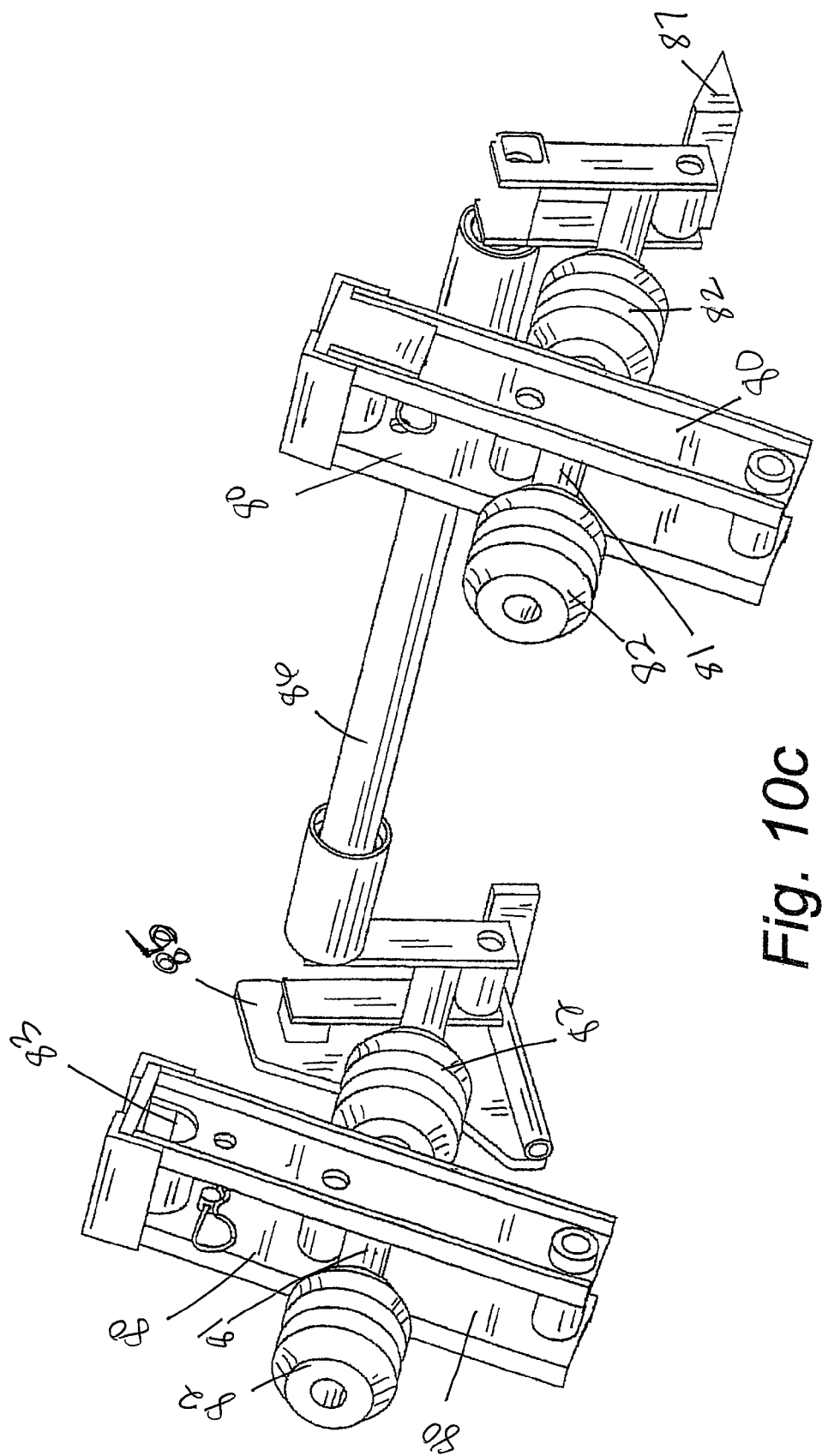
Figure 14:
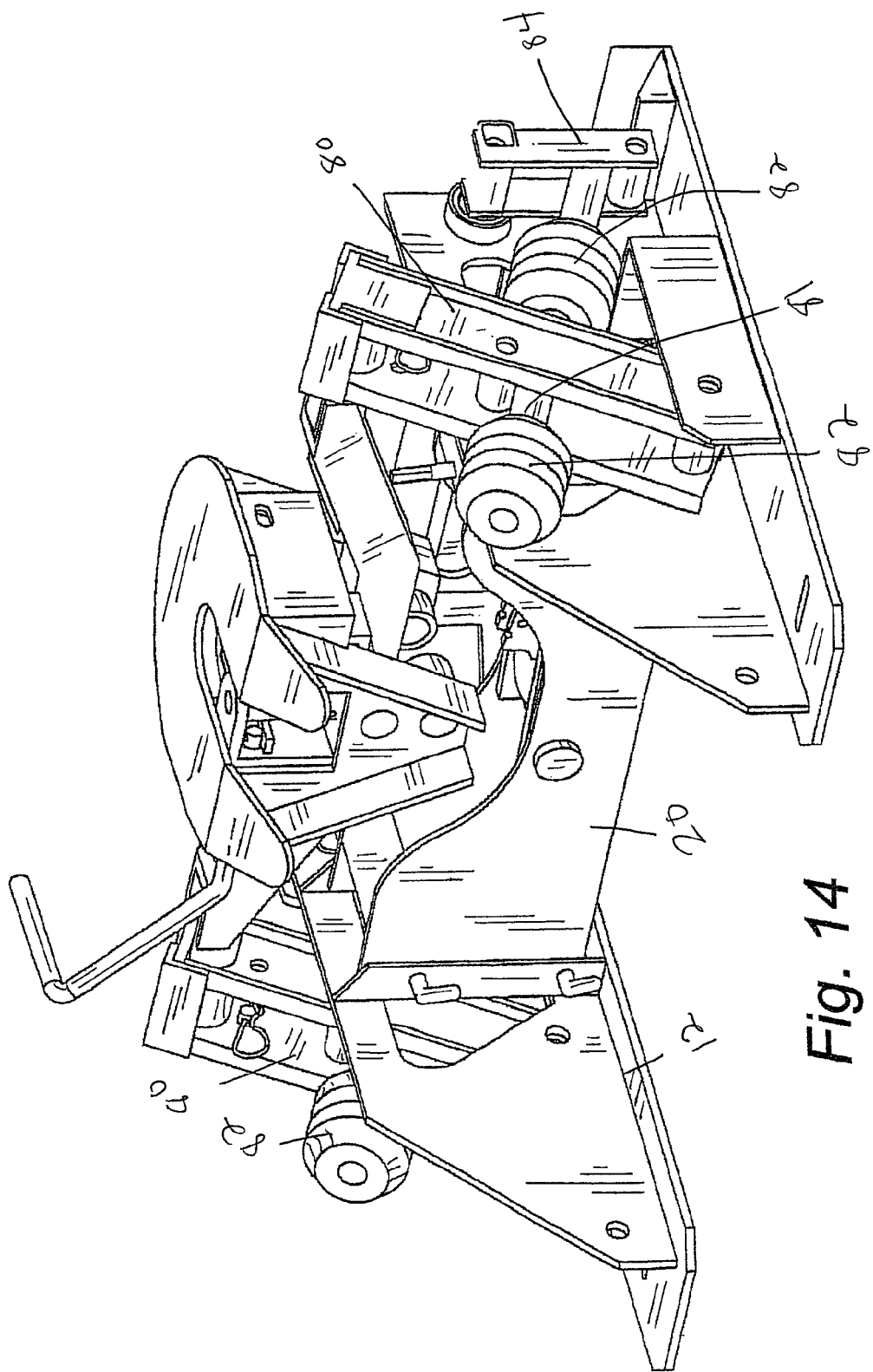
FIG. 14 is a view of the slider embodiment of the fifth-wheel hitch assembly of the present invention.

An additional embodiment of the present invention includes attaching the head to the base assembly through a slider system, in FIGS. 10a-10b, and FIG. 14. This system allows the position of the head to be moved forward or backward. In the towing position, the head is positioned approximately above the axle of the vehicle. This places proper weight on both axles of the towing vehicle. In the maneuvering position, the head moves to the rear of the hitch, giving the user more cab to camper clearance and thus the ability to make a sharper turn. The maneuvering position should be used when the vehicle and trailer need to make sharper turns than the towing position will allow, such as the campground or a gas station. This slider embodiment makes use of a pivot point to move the head. This design comprises two cushioned arms 80 that the head rests on. In FIG. 9, the head 50 rests on a cross bar 55 which connects to each cushion arm 41 on each side of the fifth wheel conversion hitch. The ends of the cross bar 55 that mate with the cushioned arms 41 are cylindrical, allowing it to pivot fore and aft. The head 50 connects to the cross bar 55, typically by a bolt 57, through a pivot, thus allowing the head to move side to side.

Each cushioned arm 80 has a pivot bar 81 through the center of the arm, and the pivot bar 81 has load boosters on either side 82. At the top end of the arm 80, a cradle 83 receives the cross bar 55 of the head assembly. An end of the arm 80 connects to a plurality of pivot plates 84. One pivot plate 84 connects to a position locking plate 85, and the other pivot plate 84 connects, at the upper end to a torsion bar 86. The torsion bar 86, located forward of the T-arm, is used to keep both pivot arms in sync and to control and limit their range of motion. When the torsion arm of the slider system is unlocked, the head is allowed to pivot on the cushioned support arms 80 the rear position. A pivot stop 87 is also provided.

A typical slide approach may also be used to position the head forward or rearward.

Figure 15:
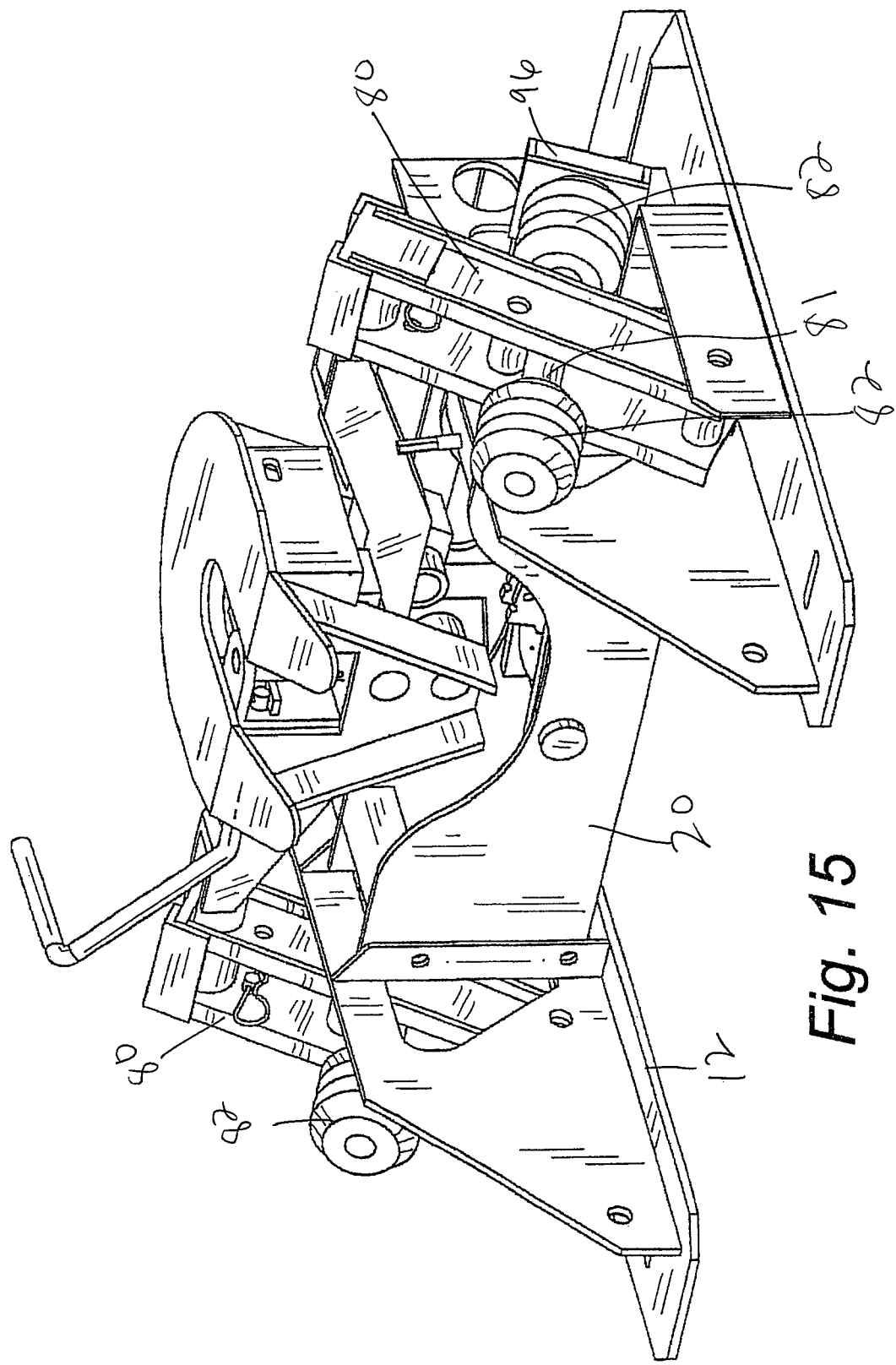
FIG. 15 is a view of the stationary embodiment of the fifth-wheel hitch assembly of the present invention.

A stationary example is shown in FIGS. 11a-b and FIG. 15. In this example, the torsion arm, torsion bearings, and lower pivot assemblies are replaced with a mounting block 96. This replacement restricts the full motion of the cushioned arms in the slider embodiment to a fixed position, only allowing the arms to move slightly as the overloads 82 absorb the shock forces.

Figure 12:
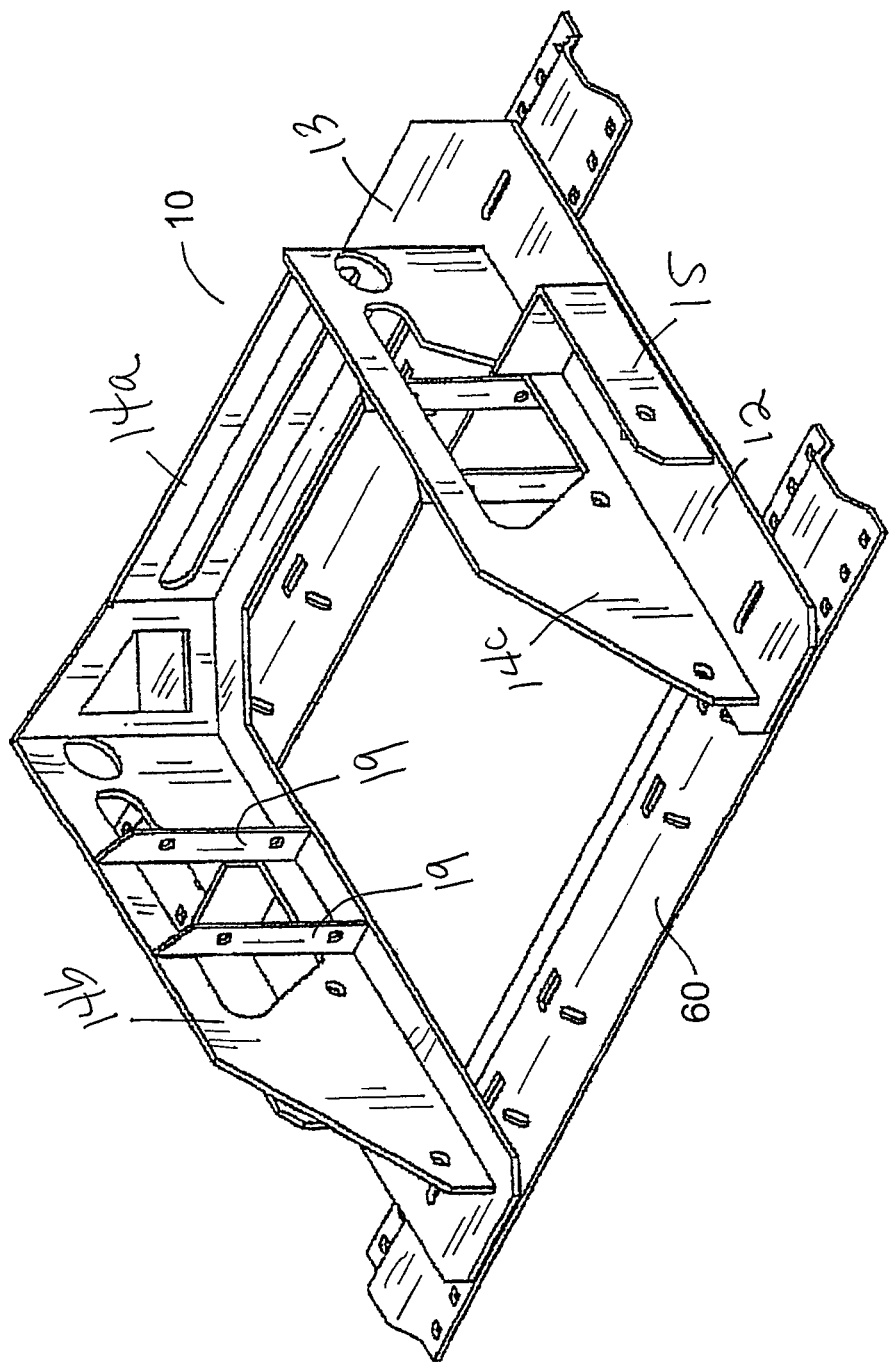
FIG. 12 is view of the fifth-wheel hitch of the present invention in association with a standard rail kit.
Figure 13:
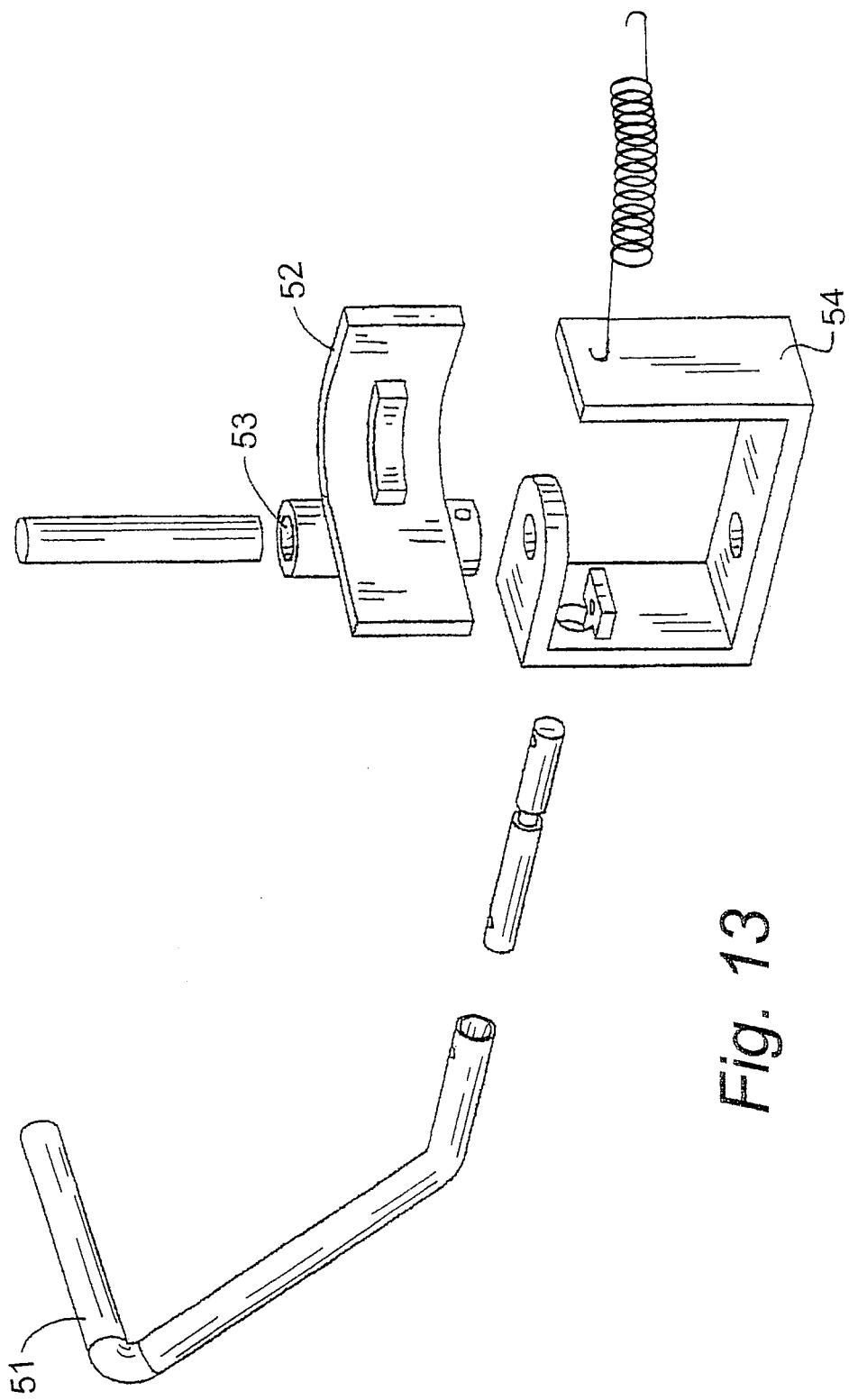
FIG. 13 is a view of the latch assembly of the present invention.

In FIG. 12, the hitch 10 of the present invention can be used with a standard fifth wheel rail kit. An adapter 60 is provided. The rail adapter 60 is installed on the underside of the flat base 13. The T-arm is not required for this use.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

The invention claimed is:

1. A fifth-wheel hitch assembly for pulling a trailer behind a towing vehicle, comprising:
   a) a base assembly having a flat base having a plurality of sidewalls;
   b) a T-arm assembly adapted to receive and secure a gooseneck assembly installed on the towing vehicle, wherein said T-arm assembly is releasably attached to said base assembly; and
   c) a hitch head assembly attached to said base assembly and adapted to releasably secure kingpin;
   wherein the hitch head assembly is secure to the base assembly with a cushioned support arm assembly; and
   further wherein the cushioned support arm assembly further comprises a plurality of arms having a cradle for receiving the hitch head assembly, the arms further having a first end connected to the base assembly and a second and a second end connected to at least one load booster and a bracket connected to the base assembly.

2. The fifth-wheel hitch assembly of claim 1, wherein the gooseneck assembly installed on the vehicle further comprises a gooseneck ball.

3. The fifth-wheel hitch assembly of claim 1, wherein the gooseneck assembly installed on the vehicle further comprises a socket post.

4. A fifth-wheel hitch assembly for pulling a trailer behind a towing vehicle, comprising:
   a) a base assembly having a flat base having a plurality of sidewalls;
   b) a T-arm assembly adapted to receive and secure a gooseneck assembly installed on the vehicle, wherein said T-arm assembly is releasably attached to said base assembly; and
   c) a hitch head assembly attached to said base assembly and adapted to releasably secure kingpin, wherein said T-arm assembly further comprises a coupler adapted to receive a gooseneck hitch ball and a tightening mechanism for securing the base assembly against the bed of a truck.

5. A fifth-wheel hitch assembly for pulling a trailer behind a towing vehicle, comprising:
   a) a base assembly having a flat base having a plurality of sidewalls;
   b) a T-arm assembly adapted to receive and secure a gooseneck assembly installed on the vehicle, wherein said T-arm assembly is attached to said base assembly and the T-arm assembly further comprises a coupler leverage system having a plurality of leverage arms; and
   c) a hitch head assembly attached to said base assembly and adapted to releasably secure kingpin.

6. The fifth wheel hitch assembly of claim 5, wherein the coupler leverage system further comprises a tightening mechanism for securing the base assembly against the bed of a truck.

7. The fifth wheel hitch assembly of claim 5, further comprising at least one cushioned support arm attached to the base assembly, wherein the cushioned support arm attaches to the base assembly at an inclined plane.

8. A fifth-wheel hitch assembly for pulling a trailer behind a towing vehicle, comprising:
   a) a base assembly having a flat base having a plurality of sidewalls;
   b) a T-arm assembly adapted to receive and secure a gooseneck assembly installed on the vehicle, wherein said T-arm assembly is releasably attached to said base assembly;
   c) a hitch head assembly attached to said base assembly by a cushioned support arm assembly and adapted to releasably secure kingpin, wherein said cushioned support arm assembly further comprises a slider assembly comprising a plurality of cushioned arms supporting the hitch head, said cushioned arms having a pivot bar with at least one load booster connected to a pivot plate assembly.

* * * * *